July 28, 1964

H. C. MULTER 3,142,492

CHUCK

Filed Sept. 11, 1962

INVENTOR.
HOWARD C. MULTER

BY Lindsey, Prutzman and Hayes
ATTORNEYS

3,142,492
CHUCK

Howard C. Multer, West Hartford, Conn., assignor to Skinner Precision Industries, Inc., New Britain, Conn., a corporation of Connecticut
Filed Sept. 11, 1962, Ser. No. 222,883
3 Claims. (Cl. 279—123)

This invention generally relates to chucks and has for a primary object the provision of an improved chuck that may be safely rotated at relatively high speeds with reduced danger to operating personnel or associated apparatus.

A further object of the present invention is to provide such a chuck which precludes escape of the chuck jaws from the chuck body. Included in this object is the provision of such a safety feature in a chuck by utilizing extremely simple and rugged structure which can be incorporated in both new and old chucks having widely varying operating mechanisms at a minimum of expense and without impairing the normal operation of such chucks.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
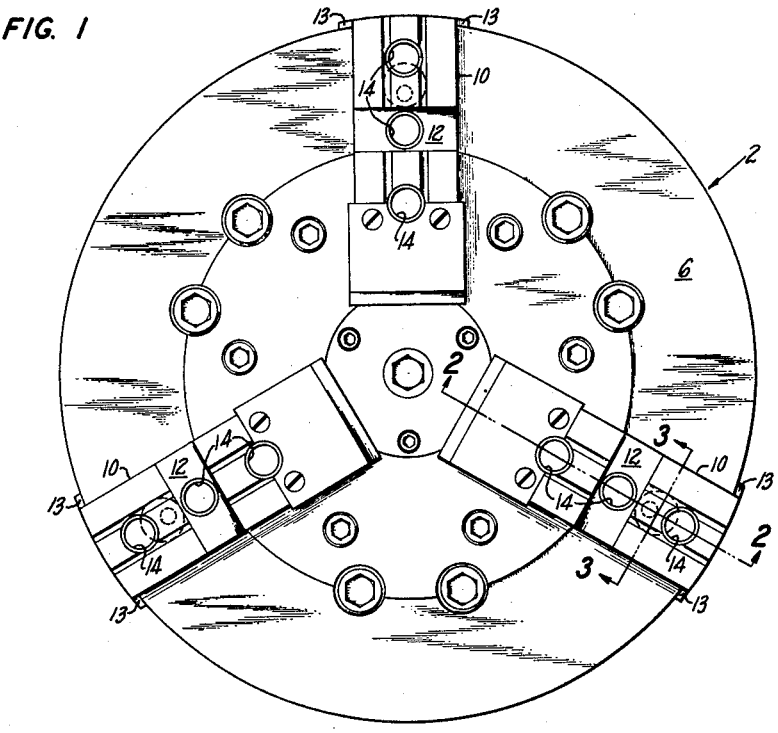
FIG. 1 is a top plan view of a chuck embodying the present invention.
Figure 3:
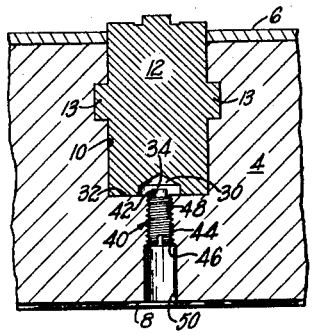
FIG. 3 is a fragmental cross-sectional view taken along lines 3—3 of FIG. 1.

Referring in detail to the drawings, a chuck generally designated 2, incorporating an embodiment of the present invention is shown for illustrative purposes as comprising a chuck body member 4 including a front face 6 and a rear face 8. The chuck body 4 is provided with three equiangularly spaced channels 10 forming guideways which respectively support three master jaws or jaw members, generally designated 12, for radial slidable movement relative to the chuck body, each jaw having opposed shoulders 13 disposed in mating recesses in the side walls of the channel. The master jaws 12 are provided with a plurality of threaded holes 14 for receiving locking screws that secure the workpiece-engaging jaws 16 to the master jaws, only one of the workpiece-engaging jaws 16 being shown in phantom in FIG. 2.

Actuation of the chuck jaws in the shown embodiment is accomplished through means of a conventional wedge actuator 18 provided with three slots 20 which respectively receive a correspondingly shaped tongue 22 formed on the ends of each of the master jaws 12. Reciprocation of the wedge actuator 18 is effective to radially slide the chuck jaws, and a suitable operating mechanism is disclosed in U.S. Patent No. 2,993,701, "Chuck Opening and Closing Mechanism" and assigned to the assignee of the present invention. Although a chuck utilizing a wedge-type actuator has been shown, the present invention is not limited thereto since it may be incorporated to equal advantage into chucks utilizing other types of jaw actuators.

In accordance with the present invention, a novel safety device is provided to limit the radial movement of the jaws should the driving connection, such as the connection to wedge 18, become inoperative. The driving connection to the master jaw constitutes the sole limit to outward radial jaw movement in many chucks thereby severely limiting the speeds at which the chuck can be rotated because of the danger that the jaw will become disconnected and act as a projectile. The illustrated embodiment of the present invention eliminates this danger by providing a safety stop including a recess 30 in the bottom face 32 of each master jaw 12 as by boring or milling. Each recess 30 provides a stop surface 34 which cooperates with a stop member 40 fixed to the chuck body 4 and having its extremity 42 projecting into the recess 30.

Each stop member 40 is preferably a screw of a high shear strength that extends through the threaded portion 44 of a bore 46, which bore is provided in the chuck body with one end in communication with the recess 30 and the other end opening into the rear face 8 of the body. Each stop screw 40 is locked in place by a plug 48 formed of nylon or the like while the rear portion 50 of each bore 46 is enlarged to facilitate insertion and removal of the stop screws.

Figure 2:
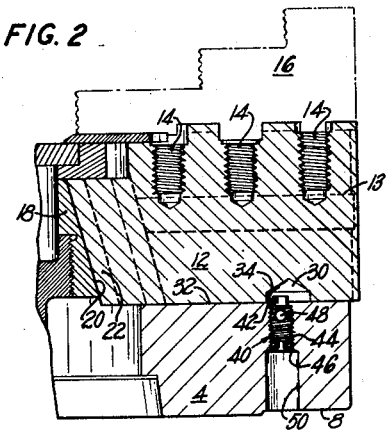
FIG. 2 is a fragmental cross-sectional view taken along lines 2—2 of FIG. 1 and additionally showing a workpiece-engaging jaw in phantom.

Referring to FIG. 2, the recess 30 is dimensioned such that the extremity 42 of the stop screw 40 will be spaced from the wall of the recess which includes the stop surface 34 so as not to obstruct the normal movement of the jaws during operation of the chuck. However, should a master jaw 12 become disconnected from the actuator 18, outward radial movement of the jaw will be arrested by engagement of the stop extremity 42 with the stop surface 34 thereby preventing the dangerous escape of the jaw from the chuck body. Moreover, the need for extremely strong yet cumbersome and expensive jaw-operating mechanisms is eliminated and potential damage occasioned by rotation of an unbalanced chuck (caused by loss of a jaw) in minimized.

The present invention thus provides an improved chuck that may be operated at relatively high speeds without regard to the danger presented by the possibility of radially escaping chuck jaws. Additionally, the safety means of the present invention is not only rugged and economical, but further may be incorporated into standard chucks, either during the manufacturing stage of such chucks or subsequent thereto, with a minimum of cost and skill.

As will be apparent to persons skilled in the art, various modifications and adaptations of the structure above described will become readily apparent without departure from the spirit and scope of the invention, the scope of which is defined in the appended claims.

I claim:

1. In a chuck comprising a body having a plurality of radially extending guideways, a plurality of jaws, respectively, mounted in the guideways for radial slidable movement, an actuator for moving the jaws and located inwardly of the jaws, and connecting means between the actuator and the jaws; a jaw limit means comprising a recess in each of the jaws and providing a stop surface, a plurality of stop screws located entirely within the body and having portions extending into the recesses, respectively, and spaced from the stop surfaces thereof during normal operation of the jaws, said stop portions adapted to engage the stop surfaces to prevent radial escape of the jaws from the chuck body in the event of breakage of said connecting means.

2. A chuck comprising a body having a front face and a rear face and a plurality of radially extending guideways opening into the front face, a plurality of master jaws mounted in the guideways for radial slidable movement and each master jaw having a work-engaging jaw extending beyond the front face of the chuck, an actuator in the body for moving the master jaws and being located radially inwardly of the master jaws, means connecting the actuator and the master jaws for transmitting movement to the master jaws, each master jaw having a recess opening towards the rear face of the body and providing a stop surface, a plurality of bores in the body, each bore having an end opening into the rear face of the body and the other end in communication with a respective recess in the jaw, a threaded portion in each of the bores, a stop screw threaded into each threaded bore portion and having a portion projecting into one of the respective recesses in the master jaws, said stop portion being spaced from the stop surface during normal operation of the master jaws but adapted to engage the stop surface to limit radial movement of the master jaws in the event of breakage of the connecting means between the master jaws and the actuator.

3. A chuck comprising a body having a front face and a rear face and a plurality of radially extending guideways opening into said front face, a plurality of master jaws mounted in the guideways for radial slidable movement, an actuator for moving the master jaws located in the body radially inwardly from the master jaws, means connecting the actuator and the master jaws for transmitting movement to the master jaws, a plurality of passages in the body each extending between the rear face of the body and one of said guideways respectively, a stop member removably secured in each of said passages in the body and having a portion projecting into one of said guideways respectively, and a stop surface on each of the master jaws spaced from said stop member during normal operation of the master jaws but adapted to engage the stop member to thereby limit the radial movement of the master jaws in the event of a disconnection between the master jaws and the actuator.

References Cited in the file of this patent

UNITED STATES PATENTS

| | | |
|---|---|---|
| 2,811,055 | Zempel | Oct. 29, 1957 |
| 2,894,757 | Schustack | July 14, 1959 |
| 2,993,701 | Arnold | July 25, 1961 |
| 3,020,058 | Feldman | Feb. 6, 1962 |